US011240629B2

(12) United States Patent
Kam et al.

(10) Patent No.: US 11,240,629 B2
(45) Date of Patent: Feb. 1, 2022

(54) ARTIFICIAL DEVICE AND METHOD FOR CONTROLLING THE SAME

(71) Applicant: LG Electronics Inc., Seoul (KR)

(72) Inventors: Mingyoung Kam, Seoul (KR); Jaeryong Kang, Seoul (KR); Jinsang Lee, Seoul (KR); Jaeki Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 16/700,469

(22) Filed: Dec. 2, 2019

(65) Prior Publication Data

US 2020/0107154 A1 Apr. 2, 2020

(30) Foreign Application Priority Data

Aug. 30, 2019 (KR) .......................... 10-2019-0107807

(51) Int. Cl.
| | |
|---|---|
| *H04W 4/021* | (2018.01) |
| *H04L 29/08* | (2006.01) |
| *G06N 3/04* | (2006.01) |
| *G06N 3/08* | (2006.01) |
| *H04W 4/029* | (2018.01) |

(52) U.S. Cl.
CPC .............. *H04W 4/021* (2013.01); *G06N 3/04* (2013.01); *G06N 3/08* (2013.01); *H04L 67/306* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 2009/0005987 | A1* | 1/2009 | Vengroff | ............... H04W 4/024 |
| | | | | 701/300 |
| 2016/0357370 | A1* | 12/2016 | Willey | .................. G06F 3/0482 |
| 2019/0171903 | A1* | 6/2019 | Vajda | ................... G06K 9/3233 |
| 2021/0117680 | A1* | 4/2021 | Chaudhri | .............. G06F 1/1639 |

* cited by examiner

*Primary Examiner* — Chris Parry
*Assistant Examiner* — Chouat Abderrahmen
(74) *Attorney, Agent, or Firm* — Fish & Richardson P.C.

(57) ABSTRACT

Disclosed are an artificial device and a method for controlling the same. In the method for controlling the artificial device according to an embodiment of the present specification, source data for creating a profile of a user is acquired and a cluster including location information of the user and data on an event associated with the location information is created. In addition, the profile of the user is created by using the cluster, and region of interest (ROI) data is generated based on the profile of the user. According to the method, the ROI data including information on a region of interest to the user may be generated. The intelligent device of the present disclosure can be associated with artificial intelligence modules, drones (unmanned aerial vehicles (UAVs)), robots, augmented reality (AR) devices, virtual reality (VR) devices, devices related to 5G service, etc.

17 Claims, 16 Drawing Sheets

FIG. 14

| Event data Type | Category | Labeling data |
|---|---|---|
| SMS/MMS | Message ROI | ○○Sushi Restaurant |
| Image/Video | Photo ROI | Sea/Sky |
| App Usage | App ROI | Instagram / SNS |
| Calendar/Task | Schedule ROI | Friends Gathering |
| Call Log | Call ROI | Mom |
| Qmemo | Memo ROI | Chocolate Recipe |
|  | Life ROI | Home/Company |
|  | Specific ROI |  |

ARTIFICIAL DEVICE AND METHOD FOR CONTROLLING THE SAME

CROSS-REFERENCE TO RELATED APPLICATIONS

This application claims the benefit of priority to Korean Application No. 10-2019-0107807, filed on Aug. 30, 2019, the contents of which are all hereby incorporated by reference herein in their entirety.

BACKGROUND OF THE INVENTION

Field of the Invention

The present disclosure relates to an artificial device and a method for controlling the same, and more particularly, to an artificial device and a method for controlling the same for generating a region of interest (ROI) of a user.

Related Art

Big data is data including structured datasets or unstructured datasets (not having database form), which are too large (tens of terabytes) to be dealt with by existing database management tools, and a big data technology is a technology for extracting value and analyzing the result from the big data. The big data technology allows individuals to provide, manage, and analyze information, and methods for providing a customized service to a user by using the big data is being under discussion.

SUMMARY OF THE INVENTION

An object of the present disclosure is to provide a method for generating an ROI meaningful to a user.

Furthermore, another object of the present disclosure is to provide a method for creating an appropriate cluster by using a user profile.

Technical objects of the present specification are not limited to the above-described technical objects, and other technical objects not described above may be evidently understood by those skilled in the art to which the present specification pertains from the following description.

According to an aspect of the present disclosure, there is provided a method for controlling an artificial device. The method includes acquiring source data for creating a profile of a user; creating a cluster in which location information of the user and data on an event associated with the location information of the user are included, by using the source data; creating the profile of the user by using the cluster; and generating region of interest (ROI) data including information on a geographic region that the user is likely to be determined to be interested in, based on the profile of the user. The ROI data includes the location information of the user and is labelled with the profile of the user.

The creating the profile of the user may include extracting a feature value from the cluster, inputting the feature value into a learned artificial neural network model, and outputting the artificial neural network model to create the profile of the user.

The method may further include: determining whether the event occurs; and acquiring the location information of the user and the data on the event when the event occurs. The event may include receiving a message through a terminal of the user, photographing, or staying in a place for a predetermined time or more.

The method may further include: determining whether a visit history of the user associated with the location information of the user exists; and including the data on the event in temporary point data corresponding to the location information of the user when the visit history of the user exists. The cluster may be associated with the temporary point data.

The method may further include generating temporary point data corresponding to the location information of the user and including the data on the event in the temporary point data, when the visit history of the user does not exist.

The method may further include determining whether labeling data for generating the ROI data is acquired based on the profile of the user. The labeling data may be associated with a data type of the event.

The method may further include storing temporary point data corresponding to the location information of the user when the labeling data is not acquired. The ROI data may be generated when the labeling data is acquired.

The method may further include determining whether the ROI data associated with the location information of the user exists. The ROI data may be generated when the ROI data associated with the location information of the user does not exist.

The ROI data may include region data indicating a predetermined region in which the location information of the user is included.

The region data may include a latitude, longitude, and range to indicate the predetermined region.

The labeling data may be acquired by extracting a feature value from the profile of the user, inputting the feature value into a learned artificial neural network model, and outputting the artificial neural network model, and the feature value is keyword information included in the profile of the user.

According to an aspect of the present disclosure, there is provided an artificial device including a communication module, a memory, a display, and a processor. The processor is configured to: acquire source data for creating a profile of a user; create a cluster in which location information of the user and data on an event associated with the location information of the user are included, by using the source data; create the profile of the user by using the cluster; and generate region of interest (ROI) data including information on a geographic region that the user is likely to be determined to be interested in, based on the profile of the user. The ROI data includes the location information of the user and is labelled with the profile of the user.

BRIEF DESCRIPTION OF THE DRAWINGS

FIG. 14 illustrates labeling data to which the present specification may be applied.

The accompanying drawings, included as part of the detailed description in order to help understanding of the present specification, provide embodiments of the present specification and describe the technical characteristics of the present specification along with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
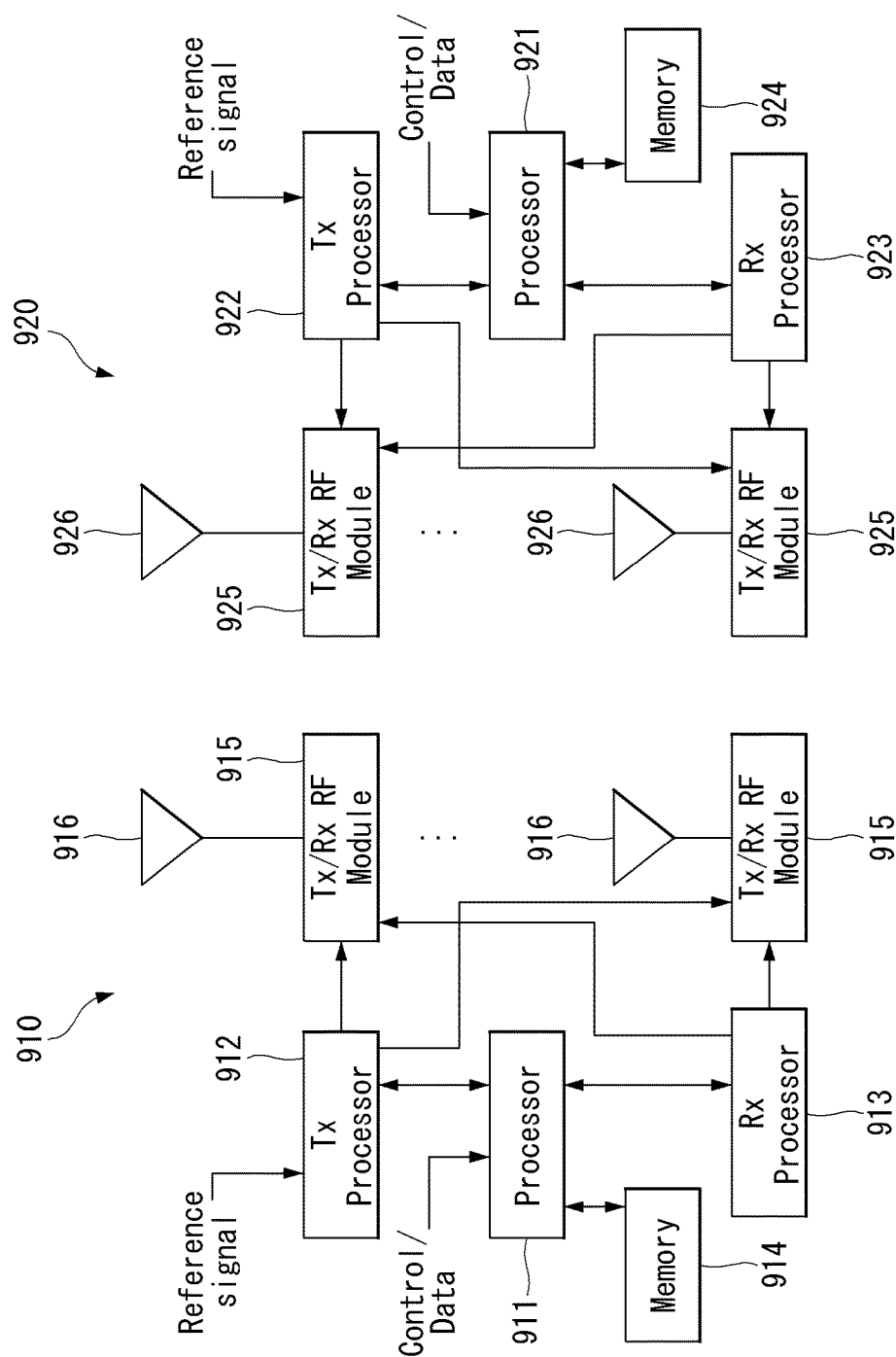
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
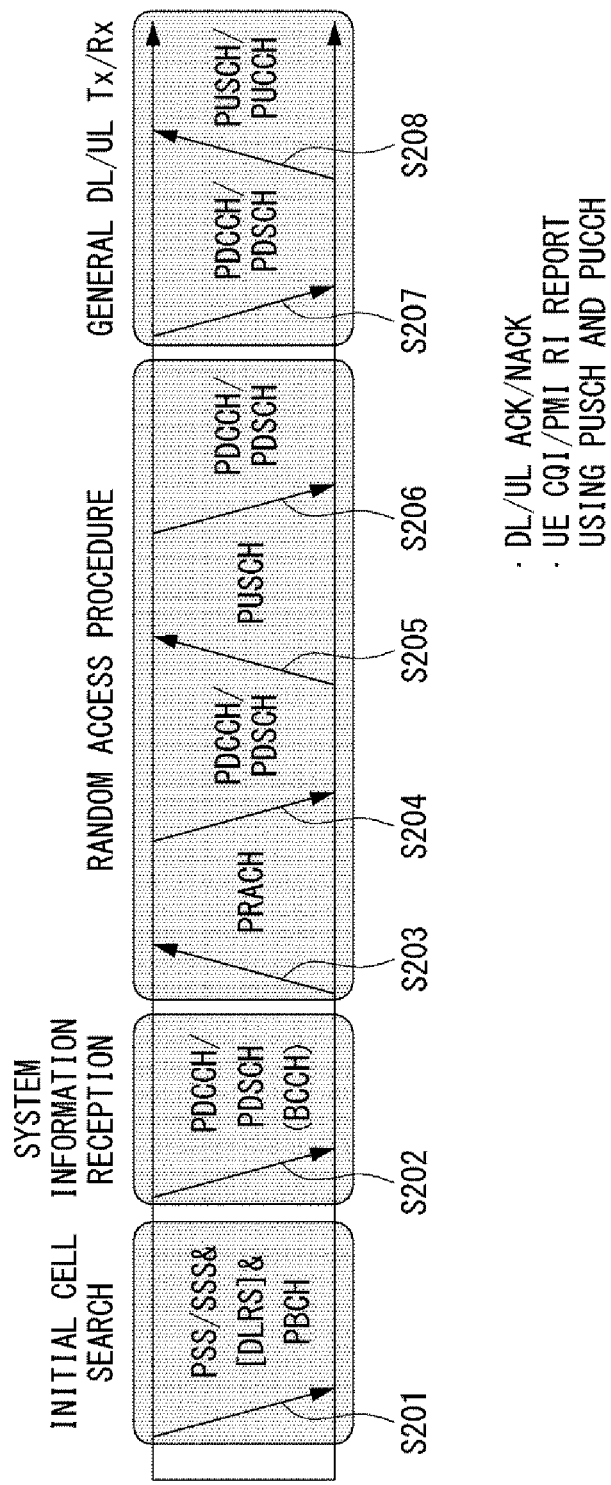
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SIBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
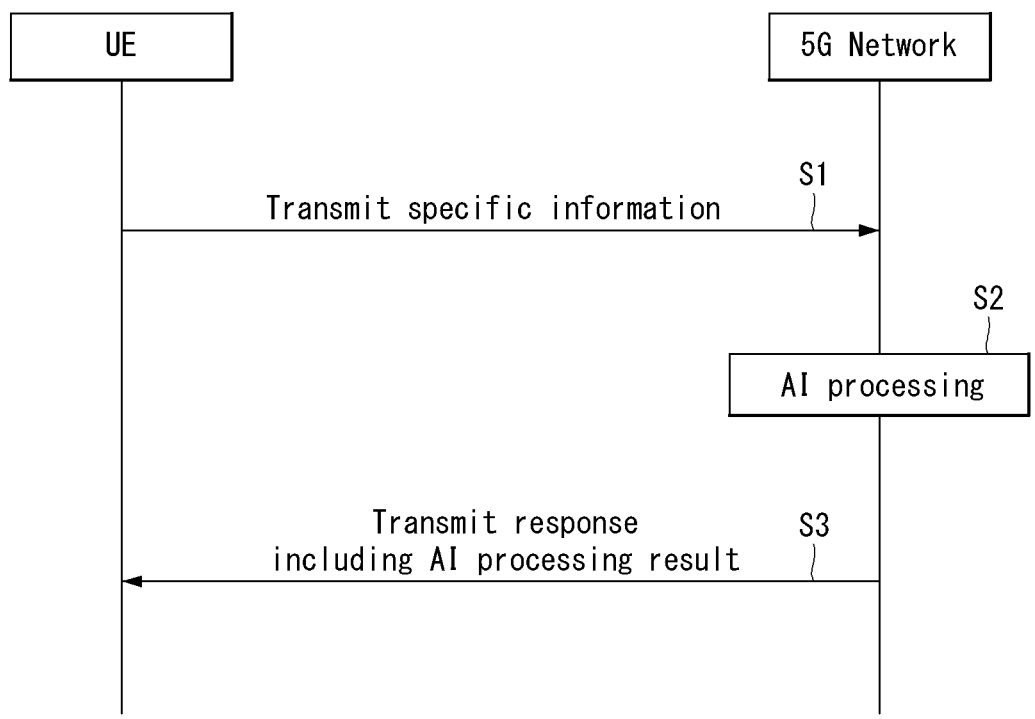
FIG. 3 shows an example of basic operations of an user equipment and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 5:
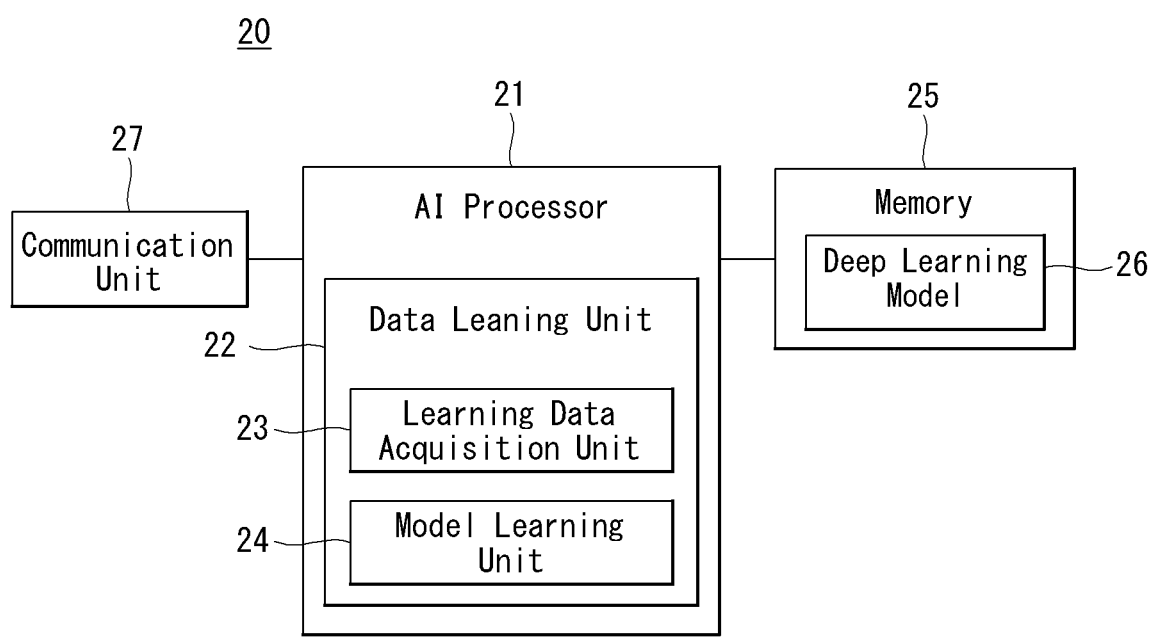
FIG. 5 is a block diagram of an AI device according to an embodiment of the present disclosure.

FIG. 5 is a block diagram of an electronic device in accordance with the present disclosure.

Referring to FIG. 5, The electronic device 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

More specifically, the wireless communication unit 110 typically includes one or more components which permit wireless communication between the electronic device 100 and a wireless communication system or network within which the mobile terminal is located. The wireless communication unit 110 typically includes one or more modules which permit communications such as wireless communications between the electronic device 100 and a wireless communication system, communications between the electronic device 100 and another mobile terminal, communications between the electronic device 100 and an external server. Further, the wireless communication unit 110 typically includes one or more modules which connect the electronic device 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 5, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the electronic device 100 and a user, as well as function as the user input unit 123 which provides an input interface between the electronic device 100 and the user.

The interface unit 160 serves as an interface with various types of external devices that can be coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control overall operation of the electronic device 100, in addition to the operations associated with the application programs. The controller 180 may provide or process information or functions appropriate for a user by processing signals, data, information and the like, which are input or output by the various components depicted in FIG. 5, or activating application programs stored in the memory 170.

In addition, the controller 180 may control at least some of the components described with reference to FIG. 5 to execute application programs stored in the memory 170. Furthermore, the controller 180 may operate at least two components included in the electronic device 100 in order to execute the application programs.

The power supply unit 190 can be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least some of the aforementioned components may operate in cooperation to implement operations, control or control methods of mobile terminals according to various embodiments which will be described below. In addition, operations, control or control methods of mobile terminals may be implemented by executing at least one application program stored in the memory 170.

Referring still to FIG. 5, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device 100, or communications between the mobile terminal and a network where another electronic device 100 (or an external server) is located, via wireless area networks. One example of the wireless area networks is a wireless personal area networks.

In some embodiments, another mobile terminal (which may be configured similarly to electronic device 100) may be a wearable device, for example, a smart watch, a smart glass or a head mounted display (HMD), which is able to exchange data with the electronic device 100 (or otherwise cooperate with the electronic device 100). The short-range communication module 114 may sense or recognize the wearable device, and permit communication between the wearable device and the electronic device 100. In addition, when the sensed wearable device is a device which is authenticated to communicate with the electronic device 100, the controller 180, for example, may cause transmission of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the electronic device 100. As another example, the cameras 121 may be located in a stereoscopic arrangement to acquire left and right images for implementing a stereoscopic image.

The microphone 122 is generally implemented to permit audio input to the electronic device 100. The audio input can be processed in various manners according to a function being executed in the electronic device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the electronic device 100. The user input unit 123 may include one or more of a mechanical input element (for example, a key, a button located on a front and/or rear surface or a side surface of the electronic device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the electronic device 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the electronic device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the electronic device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the electronic device 100. For example, the display unit 151 may display execution screen information of an application program executing at the electronic device 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The display unit 151 of the mobile terminal according to an embodiment of the present disclosure includes a transparent display, and the display unit 151 will be called a transparent display 151 in description of the structure of the electronic device 100 and description of embodiments.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the electronic device 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

An optical output module 154 can output a signal for indicating an event generation using light of a light source. Examples of events generated in the electronic device 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the electronic device 100. For example, the interface unit 160 can receive data transmitted from an external device, receive power to transfer to elements and components within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the electronic device 100 is connected with an external cradle, the interface unit 160 can serve as a passage to allow power from the cradle to be supplied to the electronic device 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The electronic device 100 may also be operated in relation to a network storage device that performs the storage function of the memory 170 over a network, such as the Internet.

The controller 180 may typically control the general operations of the electronic device 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the electronic device 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

FIG. 5 is a block diagram of an AI device according to an embodiment of the present disclosure.

An AI device 20 may include an electronic device including an AI module that can perform AI processing, a server including the AI module, or the like. Further, the AI device 20 may be included as at least one component of the vehicle 10 shown in FIG. 2 to perform together at least a portion of the AI processing.

The AI processing may include all operations related to driving of the vehicle 10 shown in FIG. 5. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 6:
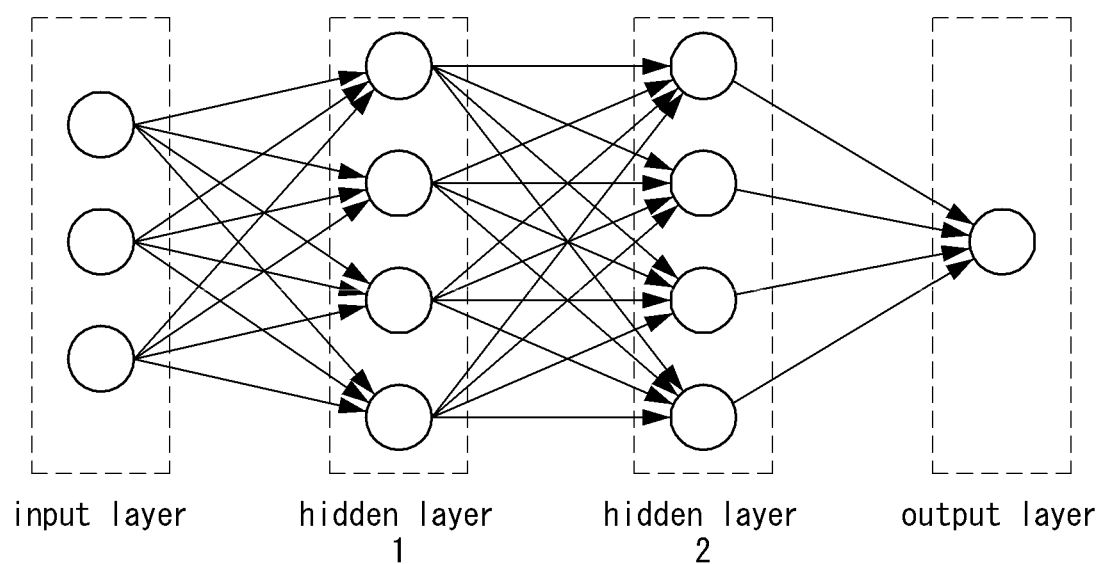
FIG. 6 shows an example of a DNN model to which the present disclosure is applicable.

FIG. 6 shows an example of a DNN model to which the present disclosure is applicable.

A deep neural network (DNN) is an artificial neural network (ANN) with multiple hidden layers between an input layer and an output layer. The deep neural network can model complex non-linear relationships like a typical artificial neural network. The extra layers enable composition of features from lower layers, potentially modeling complex data with fewer units than a similarly performing artificial neural network.

For example, in DNN architectures for object identification models, each object is expressed as a layered composition of image primitives.

The "deep" in "deep learning" refers to the number of layers in the artificial neural network. Deep learning is a machine learning paradigm that uses such a sufficiently deep artificial neural network as a learning model. Also, the sufficiently deep artificial neural network used for deep learning is commonly referred to as a deep neural network (DNN).

In the present disclosure, data sets required to train a POI data creation model may be fed into the input layer of the DNN, and meaningful data that can be used by the user may be created through the output layer as the data sets flow through the hidden layers.

While in the specification of the present disclosure, these artificial neural networks used for this deep learning method are commonly referred to as DNNs, it is needless to say that another deep learning method is applicable as long as meaningful data can be outputted in a way similar to the above deep learning method.

Figure 7:
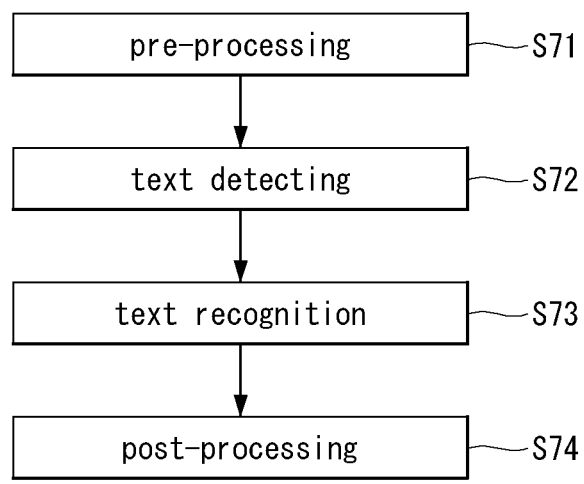
FIG. 7 shows an example of an optical character recognition (OCR) model to which the present disclosure may be applied.
Figure 8:
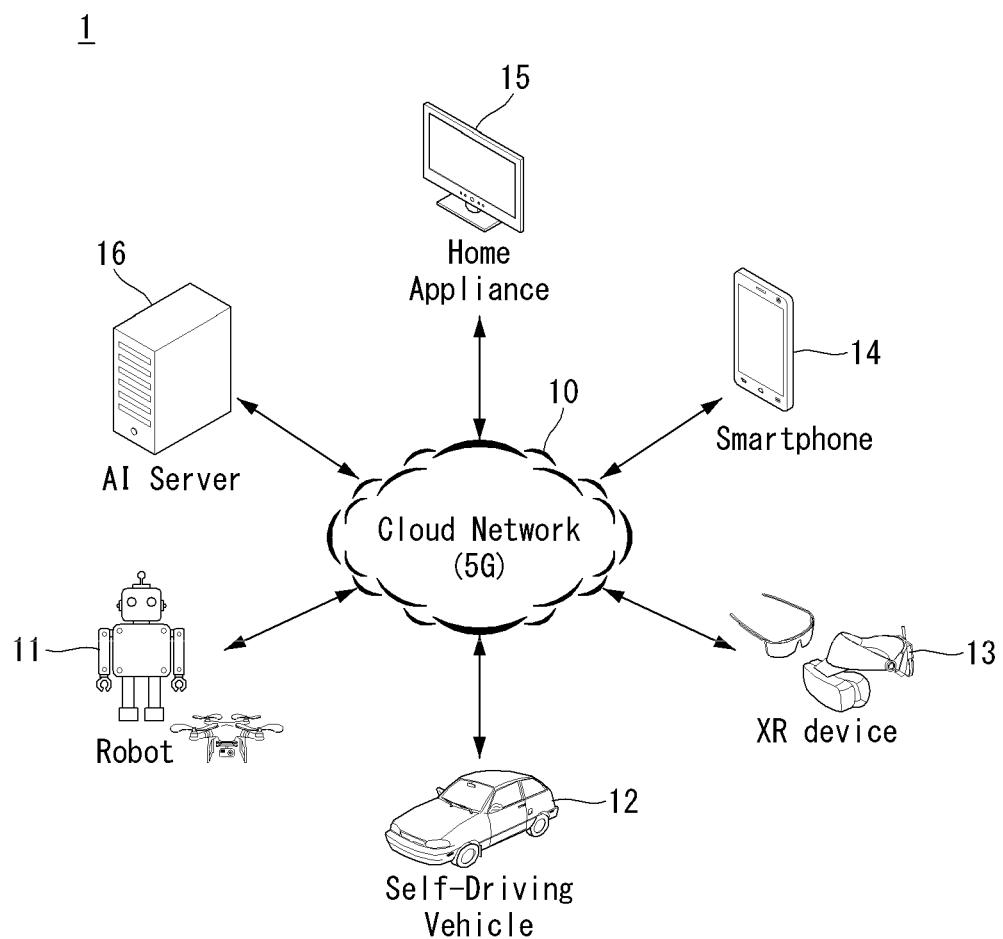
FIG. 8 shows a scenario of 5G technology to which the present disclosure can be applied.

FIG. 7 shows an example of an OCR model to which the present disclosure may be applied.

The OCR model is an automatic recognition technology that converts text and images on printed or captured images into digital data. Examples of using the technology include recognition of text of business cards or handwriting information on papers. The related art OCR model operates as a subdivided module such as a module for finding a text line and a module for splitting letters (i.e., characters). Features that recognize different patterns of these characters must to be designed by a developer. Further, the OCR model limitedly operate only in high quality images.

In recent years, the field of OCR has improved in accuracy by applying deep learning, and it generates rules (feature extraction) that recognizes text in images through massive data learning on its own. The following is an example of an OCR model using the deep learning technology.

According to an embodiment, the controller 180 may perform pre-processing by applying the deep learning-based OCR model (S71).

Computers may recognize pixels having similar brightness values as a chunk, and more easily detect a letter having a color different from the periphery and having a different structure or point of continuity. Thus, a recognition rate may be significantly improved through pre-processing.

An example of such pre-processing is as follows. A low-color image is converted into grayscale. Subsequently, histogram equalization is performed. A sharper image may be obtained by maximizing contrast by redistributing a brightness distribution of the image. However, there is still a limitation in clearly distinguishing between a background and a letter. To solve this problem, binarization is performed. If a pixel value is 255 (white), it is changed to '0', and if it is 0 to 254 (gray and black), it is changed to '1'. As a result, the background and the letter may be separated more clearly.

The controller 180 may perform a text detecting operation by applying an OCR model based on deep learning (S72).

After the image is put into the DNN, feature values are obtained. The data to be obtained is a text area (text box) and a rotation angle of the text box. Picking out the text area from the input image may reduce unnecessary computation. Rotation information is used to make the tilted text area horizontal. Thereafter, the image is cut into text units. Through this step, an individual character image or word image may be obtained.

The controller 180 may perform a text recognition operation by applying a deep learning based OCR model (S73).

In order to recognize which letter each image contains, a DNN is used. The DNN learns how to recognize individual words and letters in the form of images. Meanwhile, the types of words or strings that the DNN may recognize vary by languages. Therefore, for general-purpose OCR, a module for estimating language using only images may be necessary.

The controller 180 may perform post-processing by applying an OCR model based on deep learning (S74).

OCR post-processes character recognition errors in a similar way that humans accept text. There are two ways. The first is to use features of each letter. An error is corrected by distinguishing between similar letters (similar pairs) such as "일/밀", '먕/양', and '파/따'. The second way is to use contextual information. To this end, a language model or a dictionary may be necessary, and a language model that learns numerous text data on the web may be constructed through deep learning.

The present disclosure is to apply an existing deep learning-based OCR model in a more advanced form through federated learning (to be described later).

Text of a business card may be recognized through the camera of the terminal, the above-described deep learning-based OCR model may be used to store the text of the business card. To train the OCR model, a large amount of labeled training data is required. However, even with the OCR model trained with a large amount of data, an error inevitably occurs when new data is input in an actual use environment.

In the training method of the OCR model proposed in the present disclosure, the data generated through an inference error of the model is obtained directly from an edge device, which is an environment in which the actual model is used, and then learned, a result of the learning is transmitted to a model averaging server and merged to create a better OCR model, and thereafter, the model is transmitted to each edge-device.

Hereinafter, the concept of federated learning applied to exemplary embodiments of the present disclosure will be described.

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates a conceptual diagram one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In the present disclosure, source data may be processed and analyzed only in a terminal to derive a user profile, and using the derived information, a user's ROI meaningful to the user may be generated.

Through this, the present disclosure can automatically generate a region of interest (ROI) of the user and use it as a customized search word for each user, and improve the accuracy of the recommendation service related to the geographical point that can be provided to the user.

Intelligent Service Model

Figure 9:
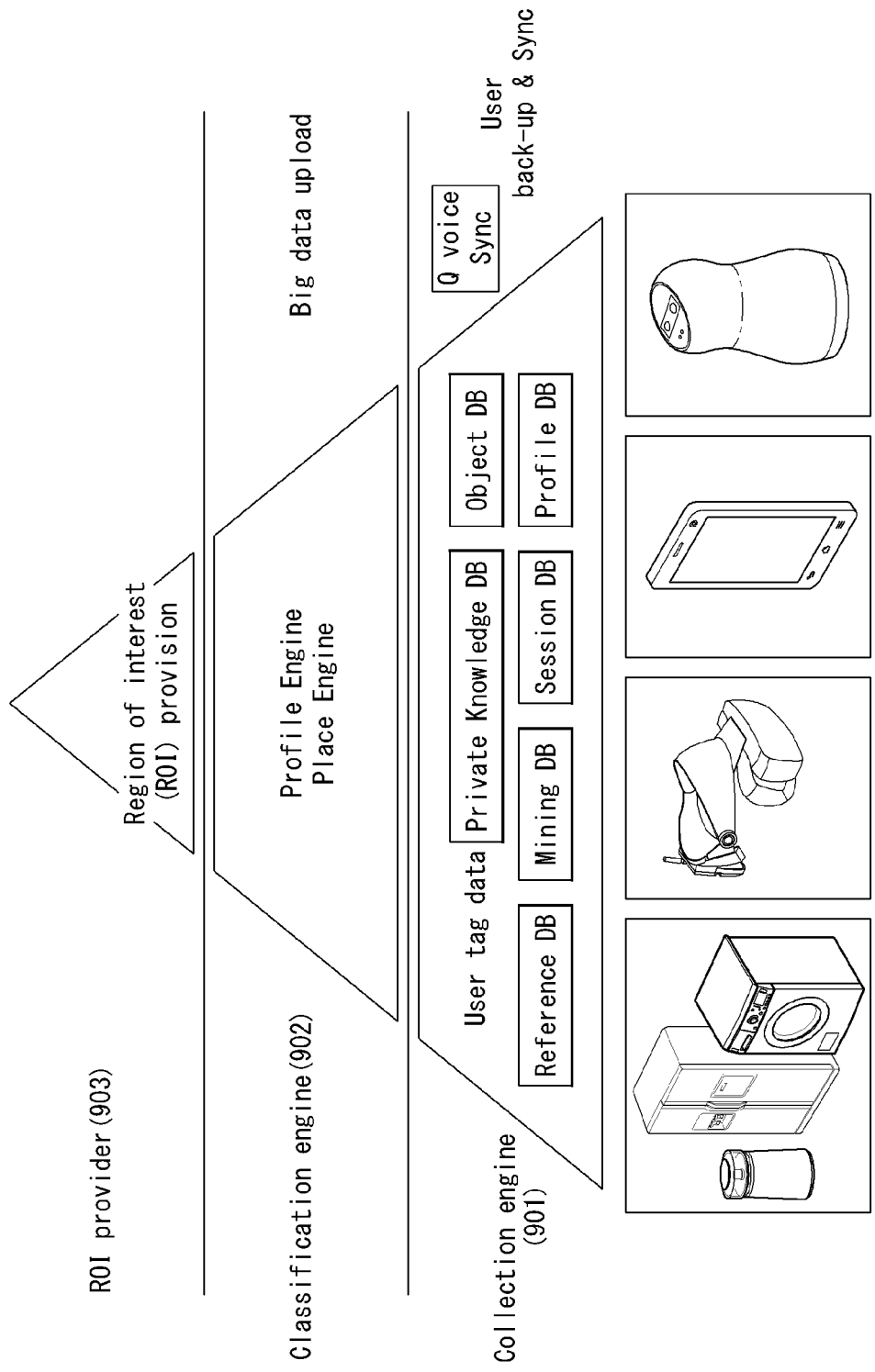
FIG. 9 illustrates an intelligent service model to which the present specification may be applied.

FIG. 9 illustrates an intelligent service model to which the present specification may be applied.

Referring to FIG. 9, the intelligent service model may include a collection engine 901, a classification engine 902, and an ROI provider 903. The intelligent service model may be installed in the form of an application and implemented through a processor 180, or may be implemented through a server connected to a user terminal and the like.

The collection engine 901 may collect source data associated with user information through a terminal used by the user. In order to generate an ROI of the user, such source data may be managed as a database (DB) built for each category that may be defined. These DBs may be included in home appliances, virtual reality devices, mobile phones, robots or the like used by the user, and may be managed by separate servers.

The classification engine 902 may classify source data acquired from the collection engine 901 by clustering. Clustering means grouping similar entities together, through which clusters may be created to create a profile of the user. To this end, the clusters may be managed by an artificial intelligence (AI) technology that may adopt the big data technology. In addition, the classification engine 902 may create the profile of the user by using the created clusters, and then, may generate the ROI of the user by using the profile of the user. In the present specification, the ROI of the user may include information on a geographic region that the user is likely to be determined to be personally interested in, according to the profile of the user.

The ROI provider 903 may provide ROI data of the user generated by the classification engine 902 to the user through the terminal.

This intelligent service model is characterized by analyzing the profile of the user and generating ROI data of the user without the user's request.

Figure 10:
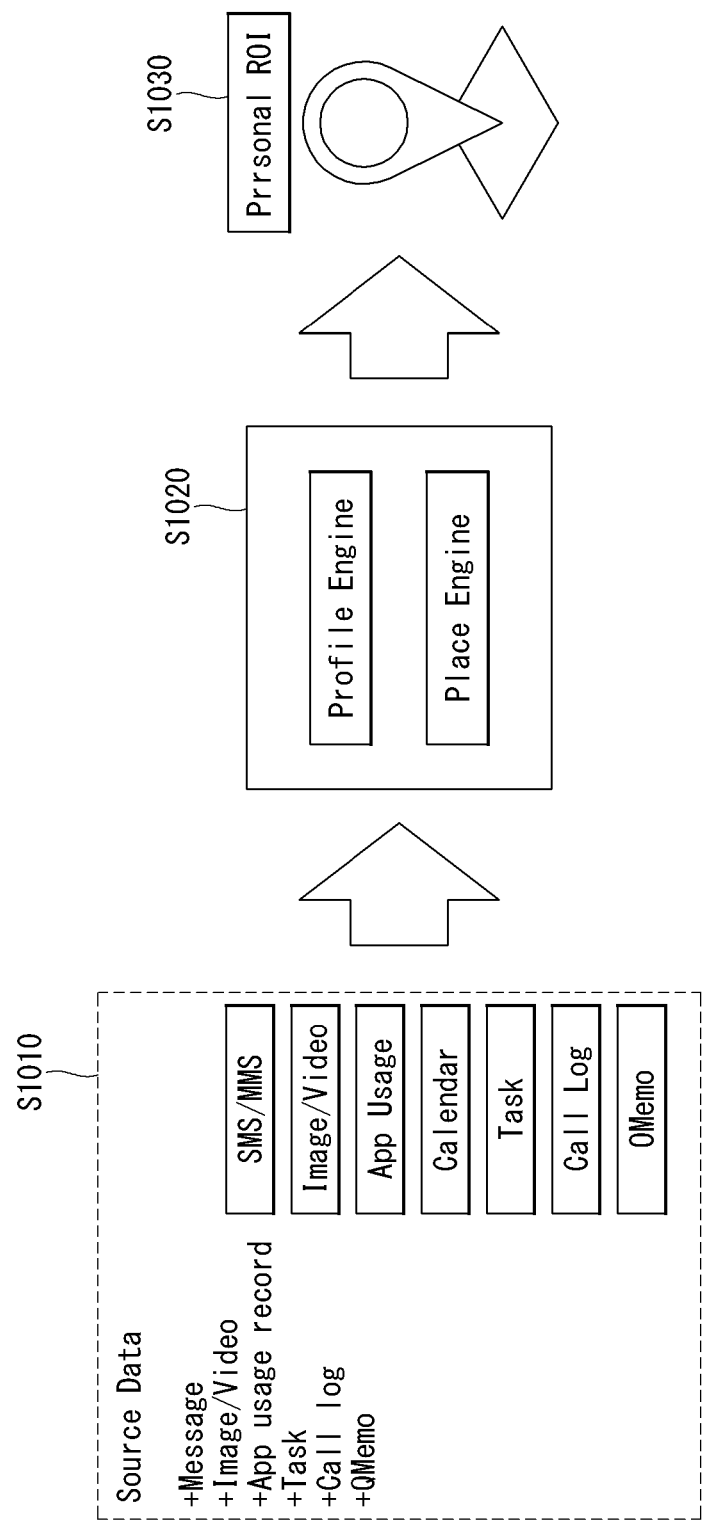
FIG. 10 illustrates a structure diagram of the intelligent service model to which the present specification may be applied.

FIG. 10 illustrates a structure diagram of the intelligent service model to which the present specification may be applied.

The collection engine 901 may collect source data through a user terminal or the like (S1010). The source data may include location information of the user, message information, images/videos, calendar information, information on "task" input by the user, call logs, memos, application usage records, and the like. As mentioned above, they may be managed by their respective DBs.

The classification engine 902 clusters the source data collected through the collection engine 901 by defined categories. The classification engine 902 may include a profile engine for creating a profile of the user by using the created clusters and a place engine for processing a cluster associated with GPS data by using the created profile of the user (S1020).

More specifically, the profile engine may create a cluster including the following information from source data that may be acquired through the user's terminal or the like.

Message: Key keyword information
Image/Video: Text information that may be extracted through image tag/OCR model, and the like
App usage record: App name/Category information
Calendar: Title/Place information
Task: Title information
Call log: Address book name/Phone number information
Memo: Key keyword information In addition, the profile engine may create the profile of the user by using the cluster. To this end, a machine learning model or a deep learning model using the clusters as input values may be used, and an AI technology may be used.

The place engine clusters GPS data that may be acquired through a user's terminal, or the like, aggregates the GPS data into meaningful region units by using the profile of the user, and labels the region units by using the profile of the user. In this way, the ROI of the user can be generated.

The ROI data of the user may include, for example, the following information.

Category: ROI classification (POI type and ROI type)
Label Name: Data labeled according to the profile of the user
Last Visit Time
Latitude
Longitude
Range
Visit count: Total visits
Day count: Total days of visits
Total stayed time The ROI provider 903 may provide the generated ROI data of the user to the user through the terminal of the user (S1030). The user may retrieve the ROI data through the information labeled for each ROI data of the user, or the processor 180 may automatically provide the user with information regarding the ROI data through the intelligent service model.

Figure 11:
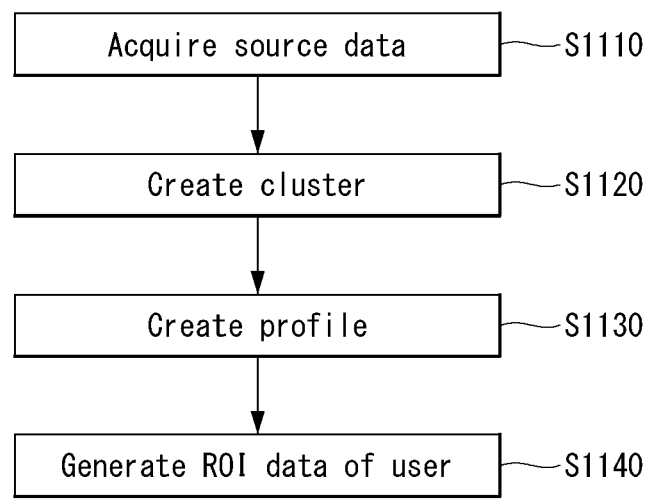
FIG. 11 illustrates an embodiment to which the present specification may be applied.

FIG. 11 illustrates an embodiment to which the present specification may be applied.

The collection engine 901 acquires source data for creating a profile of the user through the terminal of the user (S1110). Such source data may refer to big data that may be generated by a user using a terminal or the like.

In order to create a profile of the user, the classification engine 902 uses the source data to create a cluster composed of a set of data having a category related to generation of user ROI data (S1120).

In addition, the classification engine 902 analyzes the cluster to create the profile of the user (S1130). The profile of the user may refer to personal information of the user associated with the geographic region.

In addition, the classification engine 902 generates ROI data of the user by setting a geographic region that the user is interested in, based on the profile of the user, and performing a labeling operation using the profile of the user in the geographic region (S1140).

POI Data

Figure 12:
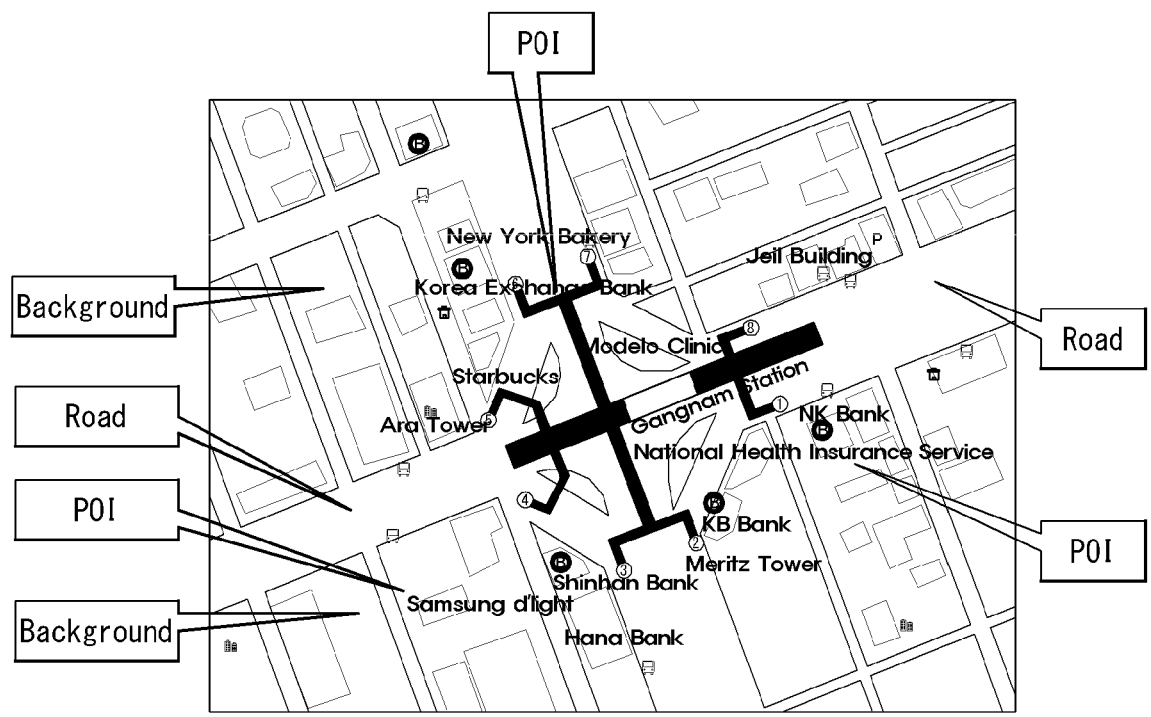
FIG. 12 illustrates an electronic map to which POI data according to the present specification may be applied.

FIG. 12 illustrates an electronic map to which POI data according to the present specification may be applied.

Point of interest (POI) data refers to data indicating major facilities, stations, airports, terminals, hotels, department stores, and the like, displayed on an electronic map with coordinates together with geographic information.

The electronic map may contain, for example, three elements such as points, lines, and polygons. On the electronic map, the three elements may represent POI data, roads, and backgrounds, respectively.

Referring to FIG. 12, the POI data may indicate Gangnam Station, Meritz Tower, National Health Insurance Service, and the like. Roads indicate common roads for general traffic, and backgrounds indicate areas marked with buildings, zones, and geographical features, or the like.

In the present specification, the processor 180 may use the POI data that may be acquired through map information to generate the ROI of the user.

Figure 4:
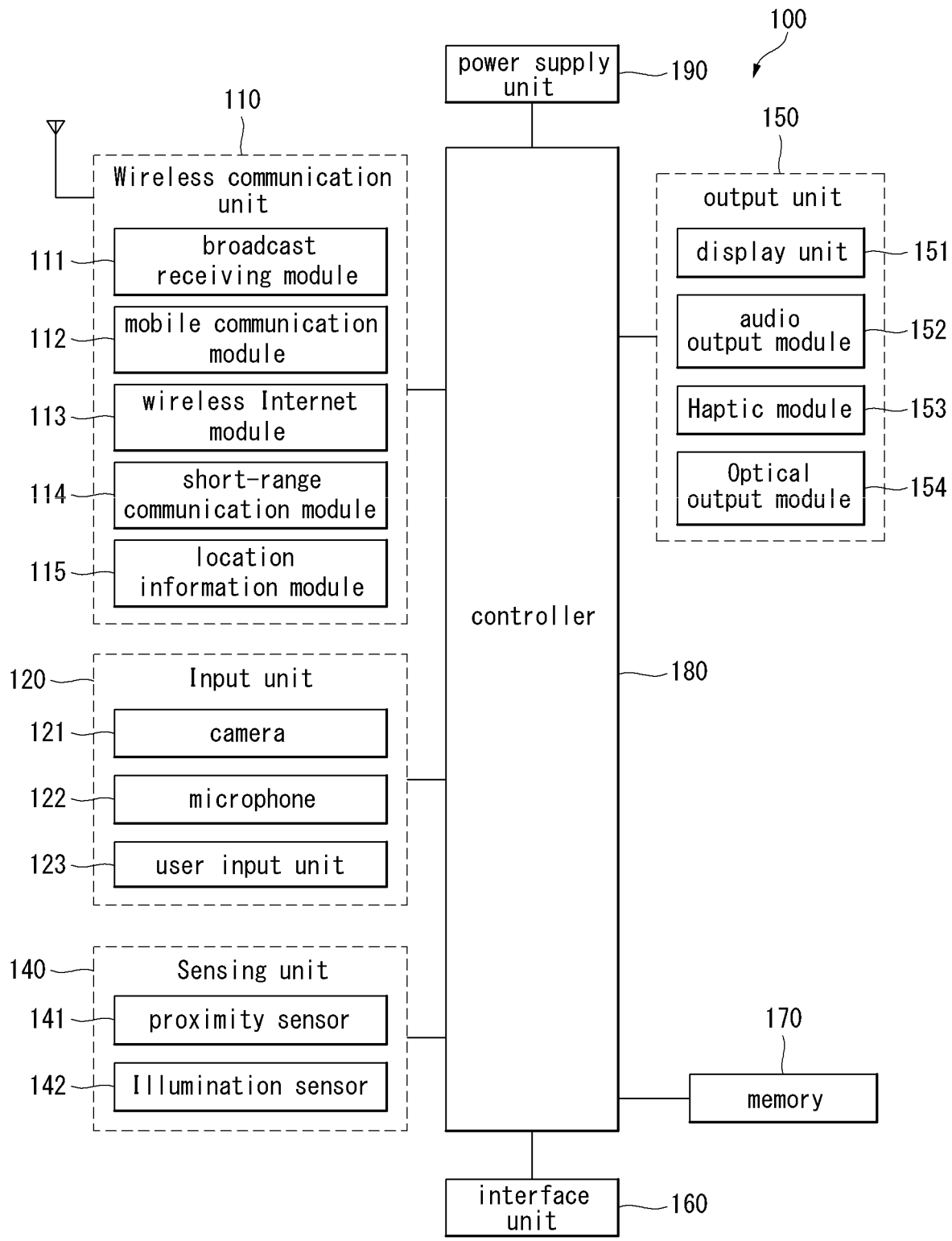
FIG. 4 is a block diagram of an electronic device in accordance with the present disclosure.
Figure 13:
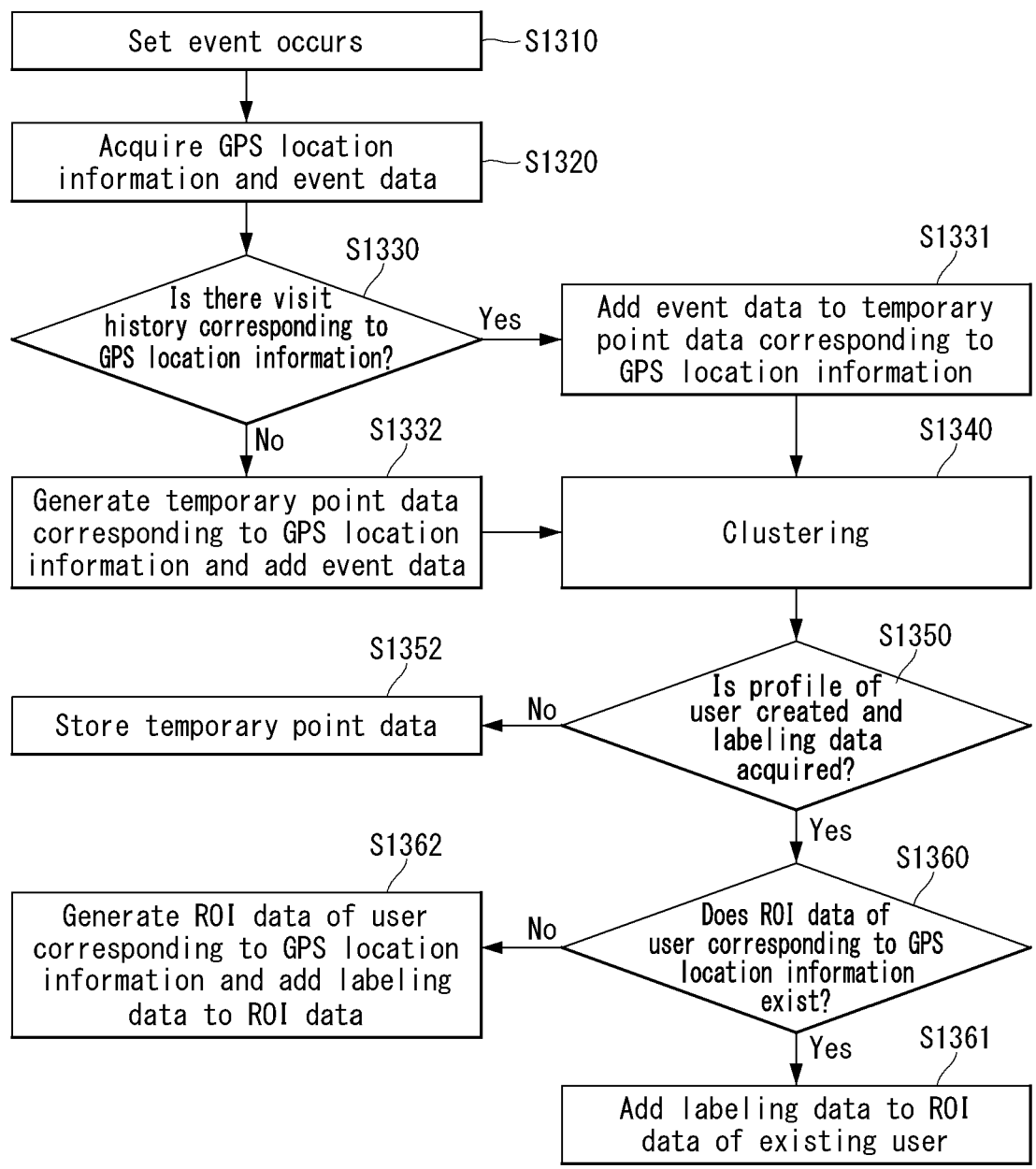
FIG. 13 is a flowchart of a method for generating ROI data of a user that may be applied to the present specification.

FIG. 13 is a flowchart of a method for generating ROI data of a user that may be applied to the present specification. The generation method illustrated in FIG. 13 may be implemented through the intelligent service model in the processor illustrated in FIG. 4.

To this end, the processor 180 may acquire source data from the terminal of the user through the intelligent service model, cluster the source data, create a profile of the user, and generate ROI data of the user including GPS location information and labeling data.

The processor 180 determines whether an event set in the terminal of the user or the like occurs (S1310). To this end, the processor 180 may monitor the terminal of the user or the like through the intelligent service model. The event may include, for example, receiving an SMS or MMS, photographing, or staying in a place for 30 minutes or more.

When the event occurs, the processor 180 acquires location information using GPS, for example, in the terminal of the user, at the time when the event occurs and data on the event (S1320).

The processor 180 determines whether a visit history corresponding to the location information exists (S1330). The visit history may be stored and managed in the memory 170 or provided from a server connected to the terminal of the user.

When the visit history exists, the processor 180 adds the data on the event to temporary point data corresponding to the location information (S1331). To this end, the temporary point data may have an event data field or a plurality of event data fields.

When the visit history does not exist, the processor 180 generates temporary point data corresponding to the location information and adds the data on the event to the generated temporary point data (S1332). To this end, the temporary point data may have an event data field or a plurality of event data fields.

The processor 180 clusters the temporary point data through the intelligent service model (S1340). Such a clustering operation may be performed by a predetermined time unit, and the criteria for creating a cluster may be, for example, a visit time, a visit count, and a data type of the event (for example, SMS, MMS, image, or call).

The processor 180 creates a profile of the user by using the cluster through the intelligent service model, and determines whether labeling data may be acquired through the created profile of the user (S1350). The profile of the user may be acquired by using data of clusters as an input value in the neural network model, and the processor determines whether labeling data may be acquired through keywords included in the profile of the user. The labeling data may refer to data that may be labeled in the ROI of the user, which may be information of personal interest to a user may be defined with respect to a specific place in relation to the profile of the user.

Such labeling data may be acquired by, for example, extracting the following keywords for each data type of the event. The acquisition of the labeling data may be performed by extracting a feature value from the profile of the user, inputting the feature value into a learned artificial neural network model, and outputting the artificial neural network model, and the feature value is keywords included in the profile of the user.

Sms/Mms: Text information on name of business that made payment
Image: Tag included in image data and Text information that may be extracted from image
App usage: Application name and Category
calendar: Title
task: Title
Call: Address book name/Phone number
Memo: Key keywords When the labeling data is not acquired, the processor 180 stores temporary point information (S1352). The temporary point information may refer to location information that does not include labeling data for generating ROI of the user but that is needed to be stored and managed. For example, a place where the user does not take pictures and does not make payments, but frequently visits for exercise or walking may be stored as temporary point information.

When the labeling data is acquired, the processor 180 determines whether ROI data of the user corresponding to the location information exists (S1360).

When the ROI data of the user exists, the processor 180 adds the labeling data to the ROI data of the user (S1361).

When the ROI data of the user does not exist, the processor 180 generates ROI data of the user corresponding to the location information and adds the acquired labeling data to the ROI data (S1362). In order to generate ROI data of the user, the processor 180 may analyze a cluster through an intelligent service model and set a predetermined region including the location information based on the geographical identity of the location information and the data association of the event, which makes it possible for the ROI data of the user to indicate the predetermined region. In this case, data fields such as a latitude, a longitude, and a range of the ROI data of the user may be used. A machine learning model learned for generating the ROI data of the user may be used, and location information and event data in the cluster may be used as input values.

The operations may be performed at the same time and are not limited to the order described above.

FIG. 14 illustrates labeling data to which the present specification may be applied.

The intelligent service model may set a category field of ROI data of the user according to the data type of the event for creating the cluster. For example, when the data type of the event is SMS/MMS, the category field may be set to a message ROI.

The labeling data may be acquired by extracting a keyword according to the data type of the event. For example, when the data type of the event is SMS/MMS, the labeling data may be acquired by extracting text information on the name of a business that the user has paid, in the message. When the text information on the name of the business that the user has paid is XX sushi restaurant, the labeling data of the ROI data of the user may be set to XX sushi restaurant.

Figure 15:
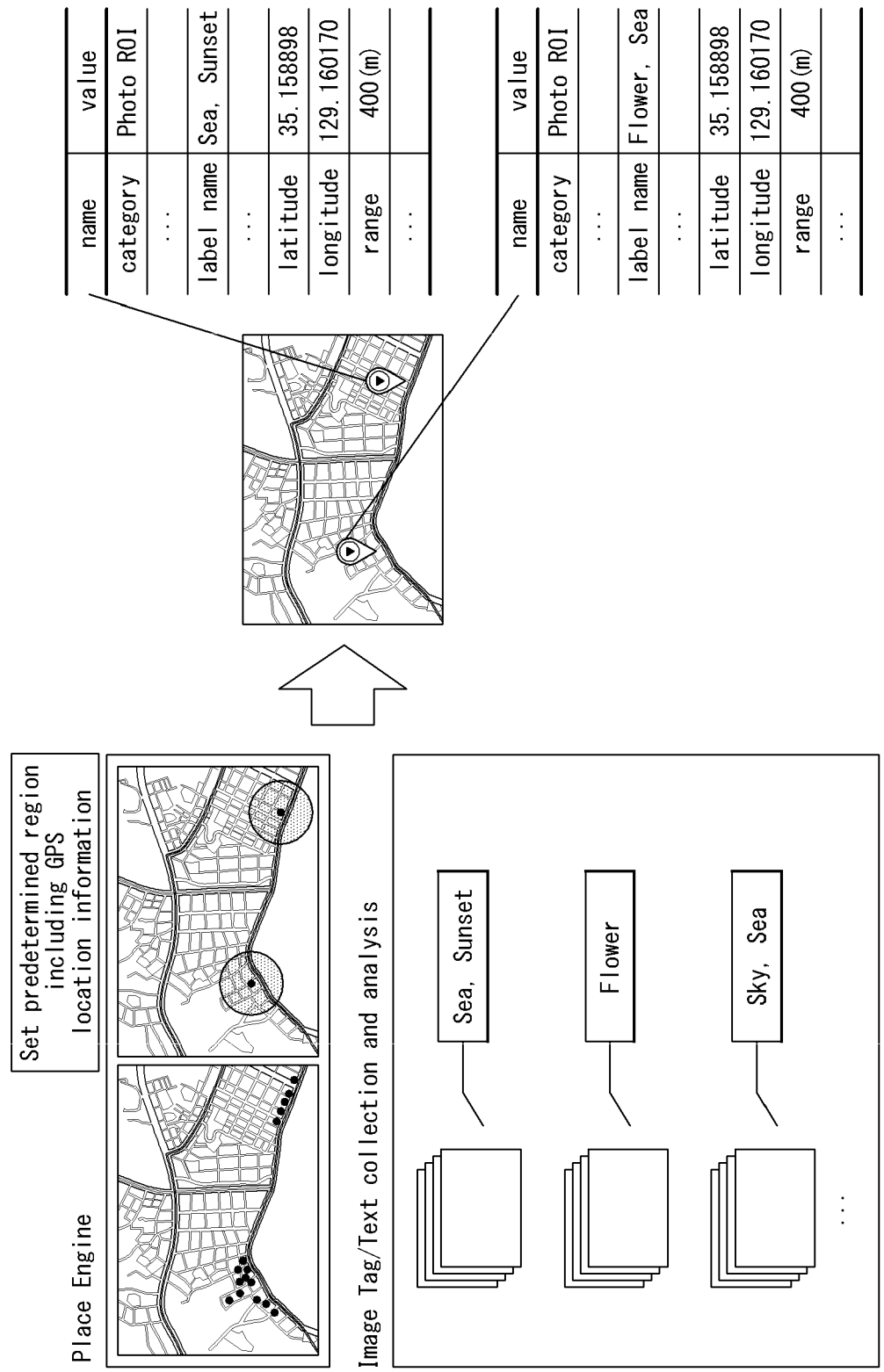
FIG. 15 illustrates an embodiment to which the present specification may be applied.

FIG. 15 illustrates an embodiment to which the present specification may be applied.

When the event set in the user terminal or the like occurs, the place engine may set a predetermined region including the acquired location information. The above-described POI data may be used for the accuracy of the initial location information, or a predetermined region of the ROI data of the user may be set based on the location information corresponding to the POI data. When the data type of the event is an image, the labeling data may be acquired by extracting a tag included in the image data and text information that may be extracted from the image. For example, when the tag included in the image data is sea or sunset, the category field included in the ROI data of the user indicating the predetermined region where the image is acquired may be set to Photo ROI, and the label name may be set to Sea or Sunset.

General Apparatus to which the Present Specification May be Applied

Figure 16:
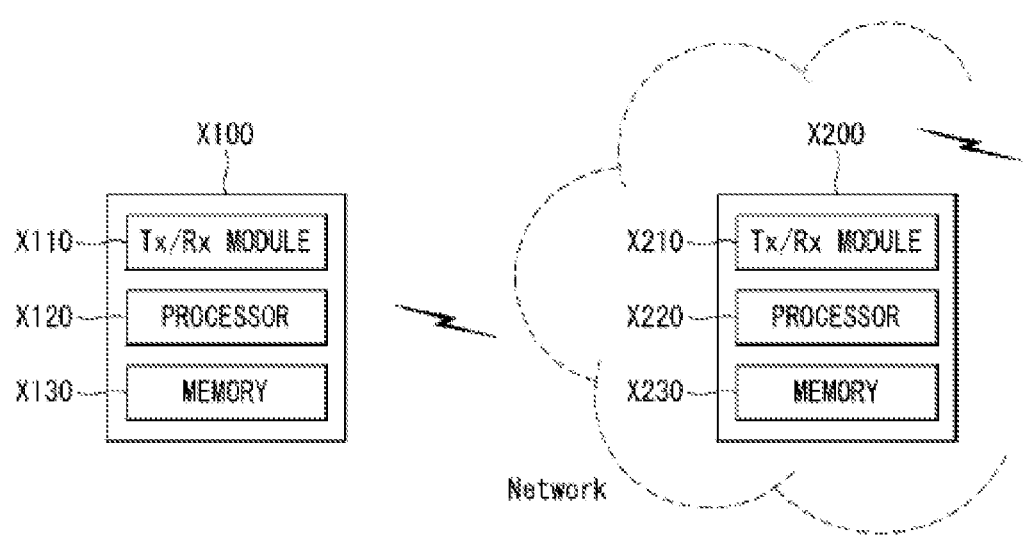
FIG. 16 is a block diagram generally showing an apparatus to which the present specification may be applied.

Referring to FIG. 16, a server X200 according to the proposed embodiment may include a communication module X210, a processor X220, and a memory X230. The communication module X210 may also be referred to as a radio frequency (RF) unit. The communication module X210 may be configured to transmit various signals, data and information to an external device and to receive various signals, data and information from an external device. The server X200 may be connected to an external device in a wire and/or wireless manner. The communication module X210 may be implemented by being separated into a transmitter and a receiver. The processor X220 may control the overall operation of the server X200, and may be configured to perform a function of calculating information to which the server X200 is to be transmitted and received with an external device. In addition, the processor X220 may be configured to perform a server operation proposed in the present specification. The processor X220 may control the communication module X110 to transmit data or a message to the UE, another vehicle, or another server according to the proposal of the present specification. The memory X230 may store the calculated information and the like for a predetermined time, and may be replaced with a component such as a buffer.

In addition, the specific configuration of the terminal device (X100) and the server (X200) as described above may be implemented so that the matters described in various embodiments of the present specification may be independently applied or may be applied in combination with two or more thereof, and description of a repeated part is omitted for clarity.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present specification has been described with reference to the examples applied to the terminal (UE) based on the 5th generation (5G) system, and may be applied to various wireless communication systems and autonomous driving apparatus as well as the examples described above.

According to embodiments of the present specification, it is possible to provide a method for generating an ROI meaningful to a user.

Furthermore, according to embodiments of the present specification, it is possible to create an appropriate cluster by using a profile of the user.

Effects of the present specification are not limited to the above-described effects, and other technical effects not described above may be evidently understood by those skilled in the art to which the present specification pertains from the following description.

What is claimed is:

1. A method for controlling an artificial intelligence device, the method comprising:
   acquiring source data from at least one user terminal of a user;
   generating, based on the source data, a cluster composed of location information of the user and data of one or more events associated with the location information;
   generating a profile of the user by analyzing the cluster; and
   generating region of interest (ROI) data by setting a geographic region in which the user is interested based on the profile of the user, wherein generating the ROI data comprises performing a labeling operation based on the profile of the user in the geographic region,
obtaining labeling data for generating the ROI data based on the profile of the user,
wherein the labeling data is extracted as keywords for data types of the one or more events,
wherein the labeling data is generated as output of a trained artificial neural network model,
wherein input of the artificial neural network is a feature value extracted from the profile of the user, and
wherein the feature value is keyword information included in the profile of the user.

2. The method of claim 1,
wherein generating the profile of the user comprises generating the profile of the user as output of a trained artificial neural network model,
wherein input of the artificial neural network model is a feature value extracted from the cluster.

3. The method of claim 1, further comprising:
acquiring the location information of the user and the data of the one or more events based on occurrence of the one or more events,
wherein the one or more events comprise receiving a message through a user terminal, photographing, or staying in a place for a predetermined time.

4. The method of claim 3, further comprising:
adding the data of the one or more events to temporary point data that corresponds to the location information of the user based on a visit history of the user that is related to the location information of the user,
wherein the temporary point data is clustered by the artificial intelligence device.

5. The method of claim 4, further comprising:
generating temporary point data that corresponds to the location information of the user and adding the data of the one or more events to the temporary point data based on absence of the visit history of the user.

6. The method of claim 1, further comprising:
storing temporary point data that corresponds to the location information of the user based on a failure to acquire the labeling data,
wherein the ROI data is generated based on the labeling data being acquired.

7. The method of claim 1,
wherein the ROI data is generated and corresponds to the location information of the user based on absence of the ROI data associated with the location information of the user.

8. The method of claim 1,
wherein the ROI data comprises region data for a predetermined region that includes the location information of the user.

9. The method of claim 8,
wherein the region data comprises a latitude, a longitude, and a range to identify the predetermined region.

10. An artificial intelligence device, comprising:
a memory;
a display; and
a processor,
wherein the processor is configured to:
acquire source data from at least one user terminal of a user;
generate, based on the source data, a cluster composed of location information of the user and data of one or more events associated with the location information;
generate a profile of the user by analyzing the cluster; and
generate region of interest (ROI) data by setting a geographic region in which the user is interested, based on the profile of the user, and
wherein generating the ROI data comprises performing a labeling operation based on the profile of the user in the geographic region,
wherein the processor is further configured to obtain labeling data for generating the ROI data based on the profile of the user,
wherein the labeling data is extracted as keywords for data types of the one or more events,
wherein the labeling data is generated as output of a trained artificial neural network model,
wherein input of the artificial neural network is a feature value extracted from the profile of the user, and
wherein the feature value is keyword information included in the profile of the user.

11. The artificial intelligence device of claim 10,
wherein the processor is further configured to generate the profile of the user as output of a trained artificial neural network model, and
wherein input of the artificial neural network model is a feature value extracted from the cluster.

12. The artificial intelligence device of claim 10,
wherein the processor is further configured to:
acquire the location information of the user and the data of the one or more events based on occurrence of the one or more events, and
wherein the one or more events comprise receiving a message through a user terminal, photographing, or staying in a place for a predetermined time.

13. The artificial intelligence device of claim 12,
wherein the processor is further configured to:
add the data of the one or more events to temporary point data that corresponds to the location information of the user, based on a visit history of the user that is related to the location information of the user, and
wherein the temporary point data is clustered by the artificial intelligence device.

14. The artificial intelligence device of claim 13,
wherein the processor is further configured to generate temporary point data that corresponds to the location information of the user and adding the data of the one or more events to the temporary point data, based on absence of the visit history of the user.

15. The artificial intelligence device of claim 10,
wherein the processor is further configured to store temporary point data that corresponds to the location information of the user based on a failure to acquire the labeling data, and
wherein the ROI data is generated based on the ROI data associated with the location information of the user being not exist.

16. The artificial intelligence device of claim 10,
wherein the ROI data is generated and corresponds to the location information of the user, based on absence of the ROI data associated with the location information of the user.

17. The artificial intelligence device of claim 10,
wherein the ROI data comprises region data for a predetermined region that includes the location information of the user.

* * * * *